(12) United States Patent
Smirnov et al.

(10) Patent No.: US 9,488,516 B2
(45) Date of Patent: Nov. 8, 2016

(54) ON-TOOL MASS FLOW CONTROLLER DIAGNOSTIC SYSTEMS AND METHODS

(71) Applicant: Hitachi Metals, Ltd., Minato-Ku Tokyo (JP)

(72) Inventors: Alexei V. Smirnov, Fort Collins, CO (US); Arun Nagarajan, San Bruno, CA (US)

(73) Assignee: Hitachi Metals, Ltd., Tokyo (JP)

( * ) Notice: Subject to any disclaimer, the term of this patent is extended or adjusted under 35 U.S.C. 154(b) by 235 days.

(21) Appl. No.: 14/211,804

(22) Filed: Mar. 14, 2014

(65) Prior Publication Data

US 2014/0260513 A1 Sep. 18, 2014

Related U.S. Application Data

(60) Provisional application No. 61/781,300, filed on Mar. 14, 2013.

(51) Int. Cl.
| | |
|---|---|
| *G01F 25/00* | (2006.01) |
| *G05D 7/06* | (2006.01) |
| *G01F 1/684* | (2006.01) |
| *G01F 5/00* | (2006.01) |

(52) U.S. Cl.
CPC ......... *G01F 25/0007* (2013.01); *G05D 7/0635* (2013.01); *G01F 1/684* (2013.01); *G01F 5/00* (2013.01)

(58) Field of Classification Search
CPC .................... G05D 7/0635; G01F 25/0007
See application file for complete search history.

(56) References Cited

U.S. PATENT DOCUMENTS

| | | | | |
|---|---|---|---|---|
| 5,311,762 A | * | 5/1994 | Drexel | G01F 25/0007 73/1.34 |
| 2003/0233860 A1 | * | 12/2003 | Deane | G01F 1/363 73/1.16 |
| 2011/0048551 A1 | * | 3/2011 | Tanaka | G05D 7/0635 137/486 |

* cited by examiner

*Primary Examiner* — Paul West
(74) *Attorney, Agent, or Firm* — Neugeboren O'Dowd PC

(57) ABSTRACT

Mass flow controllers with on-tool diagnostic capabilities and methods for on-tool diagnosis of mass flow controllers are disclosed herein. One disclosed method includes providing current to two heating-sensing elements of a mass flow sensor and modifying current through at least one of the heating-sensing elements. Reference data is obtained that characterizes proper operation of the mass flow sensor, and one or more flow sensor signals from the mass flow sensor are analyzed in connection with the reference data to assess whether the mass flow sensor is operating properly.

8 Claims, 17 Drawing Sheets

TOP/DIFFERENTIAL REFERENCE/CALIBRATION DATA

| Flow | Value Indicative of first (Differential) output | Value Indicative of second (top) output | $R_C$ | Amplitude |
|---|---|---|---|---|
| 0 | Dcal(0) | $T_{cal}(0)$ | | |
| $fcal_1$ | $Dcal_1$ | $Tcal_1$ | $(Tcal_1(fcal_1)-Tcal(0))/Dcal_1(fcal_1)$ | $sqrt[(Tcal_1(fcal_1)-Tcal(0))^2 + Dcal_1(fcal_1)^2]$ |
| $fcal_2$ | $Dcal_2$ | $Tcal_2$ | $(Tcal_2(fcal_2)-Tcal(0))/Dcal_2(fcal_2)$ | $sqrt[(Tcal_2(fcal_2)-Tcal(0))^2 + Dcal_2(fcal_2)^2]$ |
| ⋮ | ⋮ | ⋮ | ⋮ | ⋮ |
| $fcal_N$ | $Dcal_N$ | $Tcal_N$ | $(Tcal_N(fcal_N)-Tcal(0))/Dcal_N(fcal_N)$ | $sqrt[(Tcal_N(fcal_N)-Tcal(0))^2 + Dcal_N(fcal_N)^2]$ |

FIG. 17A

OPERATIONAL DATA

| Flow (f) | Differential Voltage | Top Voltage | Ratio ("R") | SF |
|---|---|---|---|---|
| 0 | D(0) | T(0) | | |
| f=fcal/SF | D(f) | T(f) | $(T(f)-T(0))/D(f)$ | Amplitude/ $sqrt[(T(f)-T(0))^2 + D(f)^2]$ |

FIG. 17B

ON-TOOL MASS FLOW CONTROLLER DIAGNOSTIC SYSTEMS AND METHODS

CLAIM OF PRIORITY UNDER 35 U.S.C. §119

The present Application for Patent claims priority to Provisional Application No. 61/781,300 entitled "ON-TOOL MASS FLOW CONTROLLER DIAGNOSTIC SYSTEMS AND METHODS" filed Mar. 14, 2013 and assigned to the assignee hereof and hereby expressly incorporated by reference.

BACKGROUND

1. Field

The present invention relates to control systems, and in particular, but not by way of limitation, the present invention relates to systems and methods for managing and maintaining mass flow controllers.

2. Background

For many manufacturing processes (e.g., thin film deposition processes), it is very important that the mass flow rates of process fluids that are fed into a process chamber be precisely controlled. But many issues arise during ongoing operation of mass flow controllers that adversely affect the ability of mass flow controllers to accurately control mass flow rates.

From the perspective of the user/operator, the particular issues that arise are often not readily apparent or are unexpected, which leads to a high cost of ownership due to unscheduled maintenance. For example, the issues (e.g., minor operating inaccuracies to complete failures) may occur without any immediate indication as to what caused the specific type of undesirable operation. Moreover, users often lack the training, tools, and/or desire to diagnose issues; thus users of mass flow controllers may simply replace mass flow controllers when issues arise. As a consequence, mass flow controllers are often replaced when information about the underlying problem could lead to a simple remedy.

To diagnose issues with a mass flow controller before any major problems occur, the mass flow controller may be removed from the tool (e.g., a plasma processing system) and run through a series of tests under controlled conditions (e.g., at a separate test location). This approach, however, requires the tool to be taken offline, which is a time consuming and potentially very costly approach to diagnosing potential problems with a mass flow controller. Accordingly, a need exists for mass flow controller diagnostic methodologies that are simpler and more cost effective.

SUMMARY

Some aspects of the present invention may be characterized as a method for on-tool diagnosis of a mass flow controller. The method may include providing current to two heating-sensing elements of the mass flow sensor and modifying current through at least one of the heating-sensing elements. One or more outputs from the mass flow sensor are then analyzed in connection with the reference data to assess whether the mass flow sensor is operating properly.

Another aspect may be characterized as a mass flow controller with on-tool diagnostics capability. The mass flow controller may include a main flow path for a fluid and a mass flow sensor coupled to the main flow path that includes two heating-sensing elements for measuring a mass flow rate of the fluid. A control component is coupled to the mass flow sensor and the valve to control a position of the valve based upon a set point. The mass flow controller also includes a sensor analysis component that includes a diagnostic signal generator that modifies current through one or both of the two heating-sensing elements, and a memory is configured to store reference data that characterizes proper operation of the mass flow sensor. The sensor analysis component also includes a diagnostic analysis component that analyzes one or more outputs from the mass flow sensor in connection with the reference data to assess whether the mass flow sensor is operating properly.

BRIEF DESCRIPTION OF THE DRAWINGS

FIG. 17A is a table that includes exemplary top/differential voltage reference data; and FIG. 17B is a table that includes exemplary operational data associated with the mass flow controller described with reference to FIG. 12.

DETAILED DESCRIPTION

Figure 1:
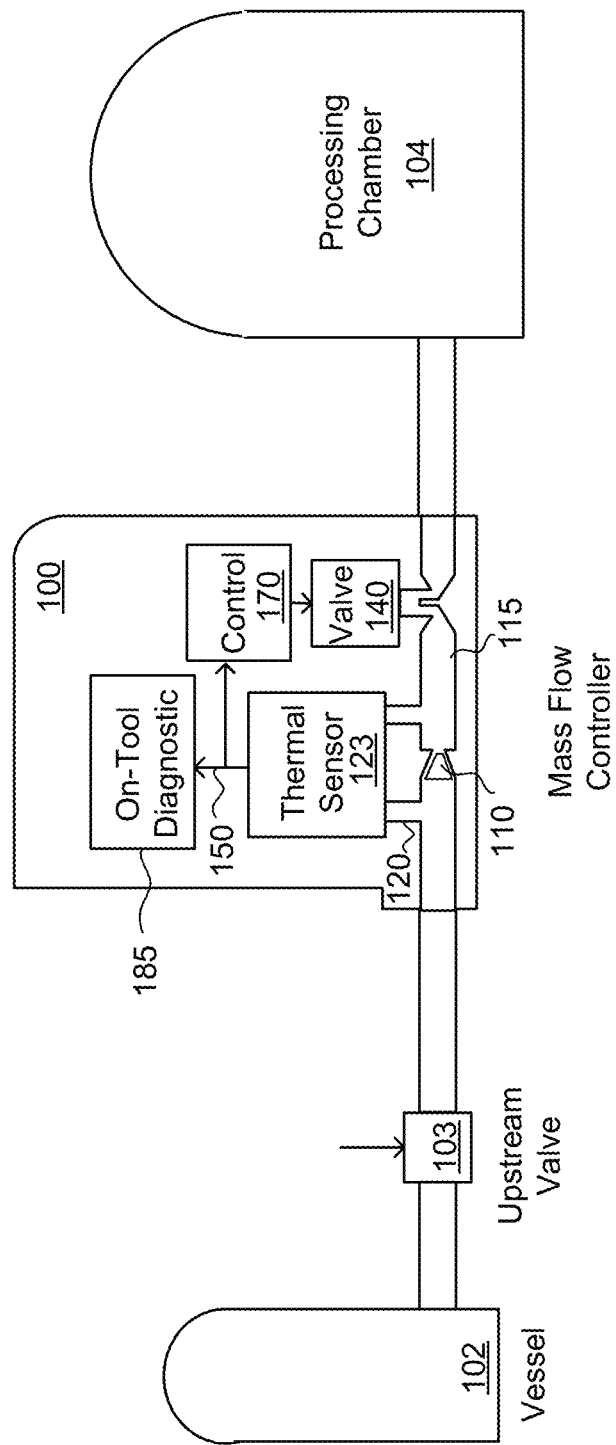
FIG. 1 is a diagram depicting an exemplary mass flow controller coupled to a plasma processing tool.

Several embodiments disclosed herein enable mass flow controllers to be assessed, on-tool (that is, while coupled to the tool), to diagnose potential issues that may lead to inaccuracies or failures of mass flow controllers. Referring to FIG. 1 for example, shown is a mass flow controller ("MFC") 100 that is coupled to a plasma-processing tool (e.g., between a fluid containment vessel 102 and a processing chamber 104). Although not required in many embodiments, an upstream valve 103 is depicted in FIG. 1. As described in more detail herein, embodiments enable operation of the mass flow controller 100 to be evaluated (e.g., between processing runs) while the mass flow controller 100 is coupled to the processing tool to avoid expensive down time and labor expense. The evaluation described herein may include a variety of different types of performance diagnostics.

As shown, the MFC 100 includes a bypass 110 through which a fluid (e.g., gas or liquid) flows, and when operating properly, the bypass 110 directs a constant proportion of fluid through a main path 115 and a sensor tube 120. As a consequence, the flow rate of the fluid through the sensor tube 120 is indicative of the flow rate of the fluid flowing through the main path 115 of the MFC 100. In some instances, however, undesirable conditions (e.g., contamination in the main flow line) may cause a disproportionate level of fluid to flow through the sensor tube 120, which leads to inaccurate flow readings. As discussed further herein, some embodiments of an on-tool diagnostic portion 185 enable any disproportionate level of flow through the sensor tube 120 to be detected (while the MFC 100 is coupled to the tool) so that the user/operator of the MFC 100 is aware of the issue and can address any problems appropriately.

As depicted, a thermal mass flow sensor 123 provides a flow sensor signal 150 that is indicative of the flow rate through the sensor tube 120, and hence, indicative of the flow rate through the main path 115 of the MFC 100. The flow sensor signal 150 is utilized by a control portion 170 to control the mass flow rate of the fluid through the MFC with a valve 140. And in addition, some variations of the on-tool diagnostic portion 185 implement on-tool methodologies for assessing whether there are potential problems with the thermal mass flow sensor 123. For example, the on-tool diagnostic portion 185 may implement one or more methodologies to assess sensitivity of the thermal mass flow sensor 123 and may provide an indication of contamination in the sensor tube 120.

In several embodiments, the fluid controlled by the MFC 100 is a gas (e.g., nitrogen), but a person skilled in the art will appreciate, having the benefit of this disclosure, that the fluid being delivered by the MFC 100 may be any kind of fluid including, for example, a mixture of elements and/or compounds in any phase, such as a gas or a liquid. Depending upon the application, the MFC 100 may deliver a fluid in a gaseous state (e.g., nitrogen) and/or a liquid state (e.g., hydrochloric acid) to, for example, the tool in a semiconductor facility. The MFC 100 in many embodiments is configured to deliver a fluid under high pressure, low temperature, or to different types of containers or vessels.

Figure 2:
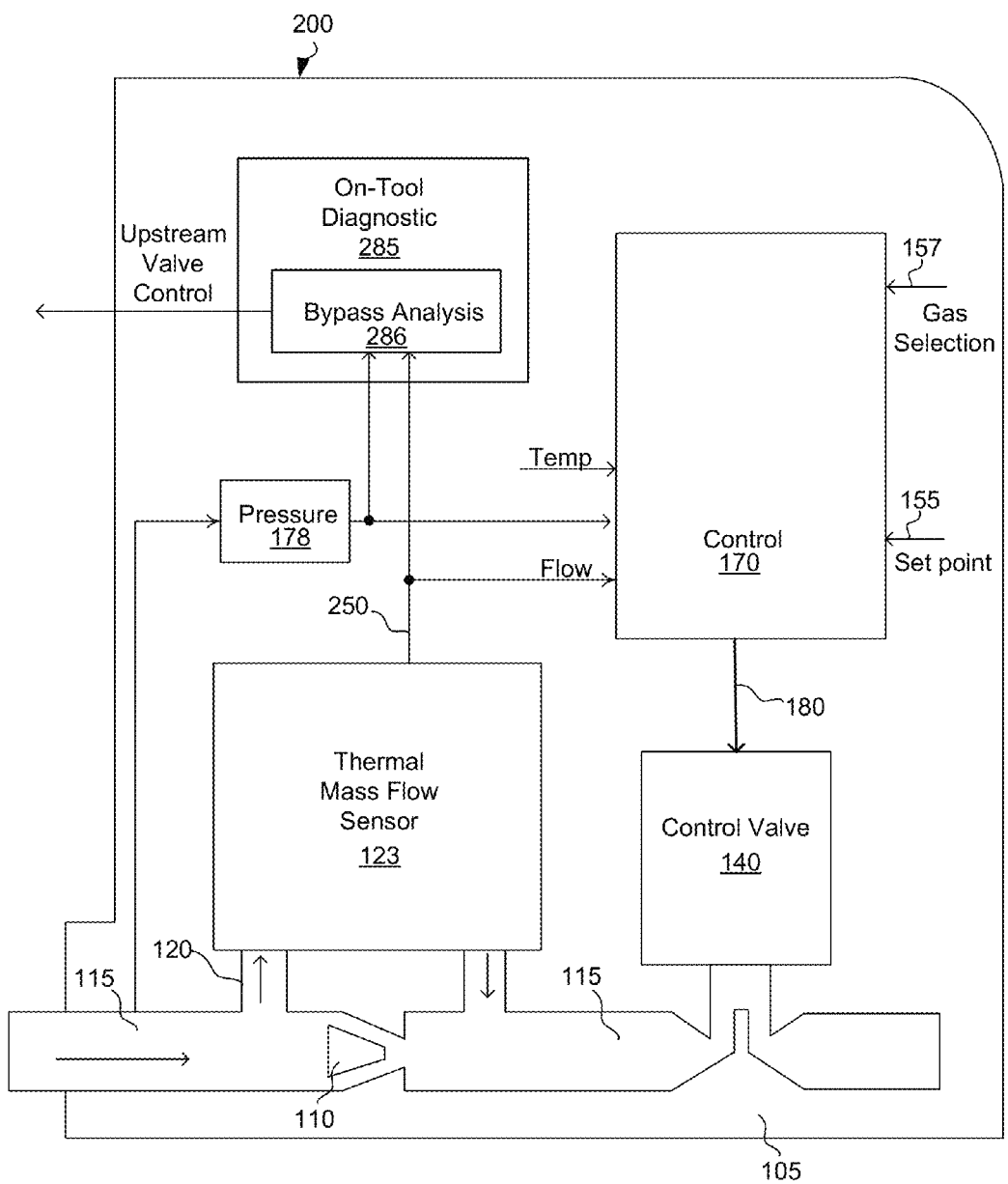
FIG. 2 is a diagram depicting one embodiment of the mass flow controller illustrated in FIG. 1.

Referring next to FIG. 2, shown is an MFC 200 that includes an on-tool diagnostic portion 285 that includes a bypass analysis component 286 to diagnose whether the amount of total flow that is diverted through the sensor tube 120 is the amount that is expected so that the thermal mass flow sensor 123 provides an accurate indication of the flow level through the main path 115.

As discussed above, the thermal mass flow sensor 123 provides a flow sensor signal 250 that is indicative of a mass flow rate of a fluid through the main path 115 of the MFC 200. As one of ordinary skill in the art will appreciate, the thermal mass flow sensor 123 may include sensing elements (not shown) that are coupled to (e.g., wound around) the outside of sensor tube 120. In one illustrative embodiment, the sensing elements are resistance-thermometer elements (e.g., coils of conductive wire), but other types of sensors (e.g., resistance temperature detectors (RTD and thermocouples)) may also be utilized in the embodiment depicted in FIG. 2. Moreover, other embodiments may certainly utilize different numbers of sensors and different architectures for processing the signals from the sensors without departing from the scope of the present invention.

One of ordinary skill in the art will also appreciate that the thermal mass flow sensor 123 may also include a sensing-element circuit (e.g., a bridge circuit) that provides a flow sensor signal 250 as an output, which is indicative of the flow rate through the sensor tube 120, and hence, indicative of the flow rate through the main path 115 of the MFC 100. And the flow sensor signal 250 may be processed so that it is a digital representation of the mass flow rate of a fluid through the main flow path 115 of the MFC 100. For example, the thermal mass flow sensor 123 may include amplification and analog to digital conversion components to generate the flow sensor signal 250.

In alternative embodiments, the thermal mass flow sensor 123 may be realized by a laminar flow sensor, coriolis flow sensor, ultrasonic flow sensor or differential pressure sensor. Pressure measurements may be provided by a gage pressure sensor, differential sensor, absolute pressure sensor or piezoresistive pressure sensor. In variations, the thermal mass flow sensor 123 and/or pressure measurements are used in combination with any combination of other sensors (e.g., temperature sensors) to accurately measure the flow of the fluid.

The control component 170 in this embodiment is generally configured to generate a control signal 180 to control a position of the control valve 140 based upon a set point signal 155. The control valve 140 may be realized by a piezo valve or solenoid valve, and the control signal 180 may be a voltage (in the case of a piezo valve) or current (in the case of a solenoid valve). And as one of ordinary skill in the art will appreciate, the MFC 200 may include a pressure sensor 178 and a temperature sensor (not shown) that provide respective pressure and temperature inputs to the control component 170. For example, the pressure sensor 178 may be placed to sense pressure in the main path 115 upstream of the sensor tube 120 (as depicted in FIG. 2) or downstream of the bypass 110.

In this embodiment, the bypass analysis component 286 generally operates to assess whether an expected proportion of fluid is flowing through the sensor tube 120 relative to the main path 115. As discussed above, the ratio of mass flow through the sensor tube 120 to the mass flow through the main path 115 must be known; otherwise measurements of the mass flow through the sensor tube 120 will not provide an accurate indication of the mass flow through the main path 115. It is known, however, that when the mass flow rate of the fluid is relatively high, the flow characteristics of the fluid change from laminar flow to turbulent flow; thus, a higher proportion of fluid may flow through the sensor tube 120, which provides an inaccurate indication of the mass flow rate through the main path 115.

Figure 3:
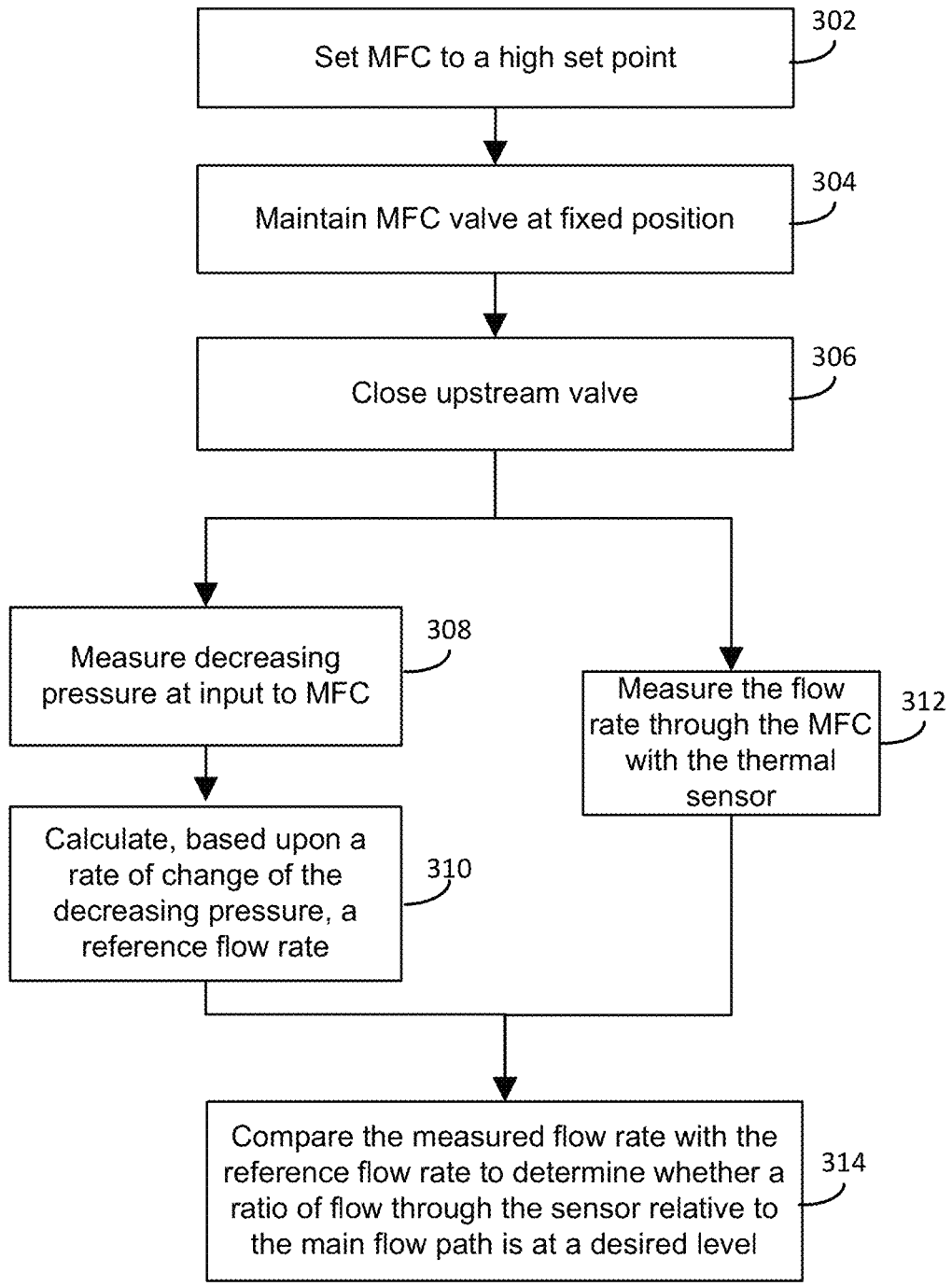
FIG. 3 is a flowchart illustrating a method that may be traversed by the mass flow controller depicted in FIG. 2.
Figure 4A:
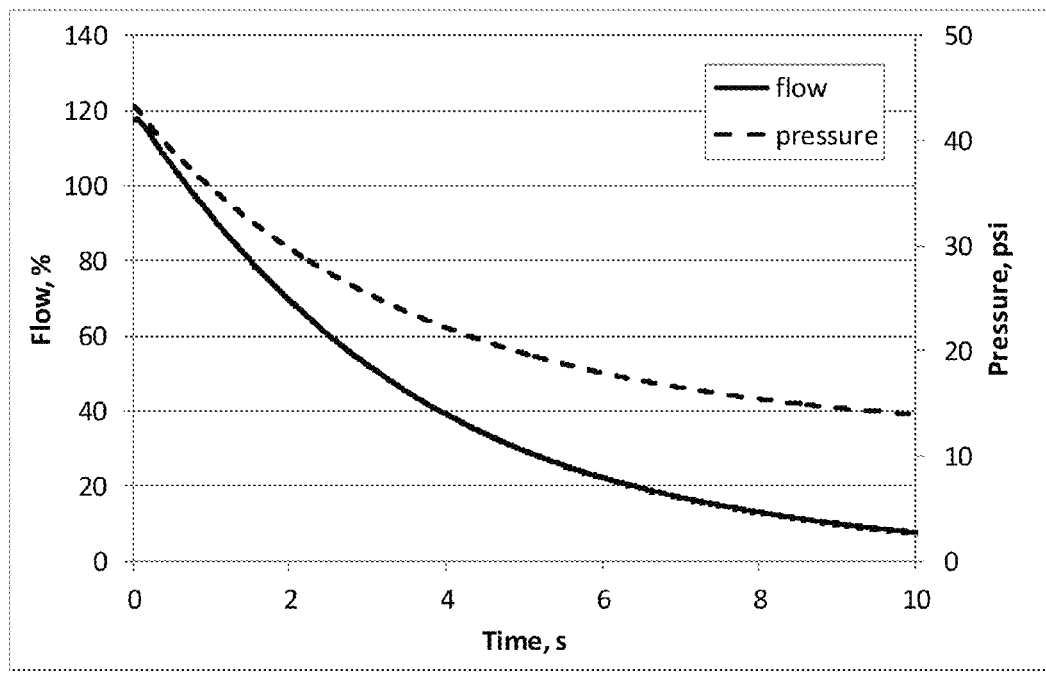
FIG. 4A is a graph depicting an exemplary flow rate and pressure of a fluid.

While referring to FIG. 2 simultaneous reference is made to FIG. 3, which is a flowchart depicting an exemplary method for assessing whether the ratio of sensor tube flow to main path flow has departed from a desired value. As depicted, the set point 155 of the MFC 200 may be set to a high level (e.g., 100% of full flow)(Block 302), and then the position of the valve 140 that provides the high level of flow is maintained (Block 304). The upstream valve 103 (upstream from the sensor tube 120) is then closed (Block 306), and a level of decreasing fluid pressure is then measured (e.g., by the pressure sensor 178)(Block 308). Referring briefly to FIG. 4A, it depicts measured flow ("flow") and fluid pressure versus time for an exemplary mass flow controller where the upstream valve 103 was closed at time t=0.

As shown in FIG. 3, based upon this decreasing pressure measurement (Block 308), a reference flow rate is calculated based upon a rate of change of the decreasing pressure (Block 310). The reference flow rate is generally a calculation of flow through the MFC 200 that is based upon pressure readings from the pressure sensor 178, and in many embodiments, the reference flow rate may simply be calculated as a rate of change (dp/dt) of the decreasing pressure. In some embodiments, as depicted in FIGS. 1 and 2, the upstream valve 103 is external to the MFC, and the upstream valve 103 may be closed by a signal from the MFC 200 or may be closed by a signal from a separate processing tool. In other embodiments the upstream valve 103 is integrated into the MFC 200 and positioned upstream from the sensor tube 120.

Figure 4B:
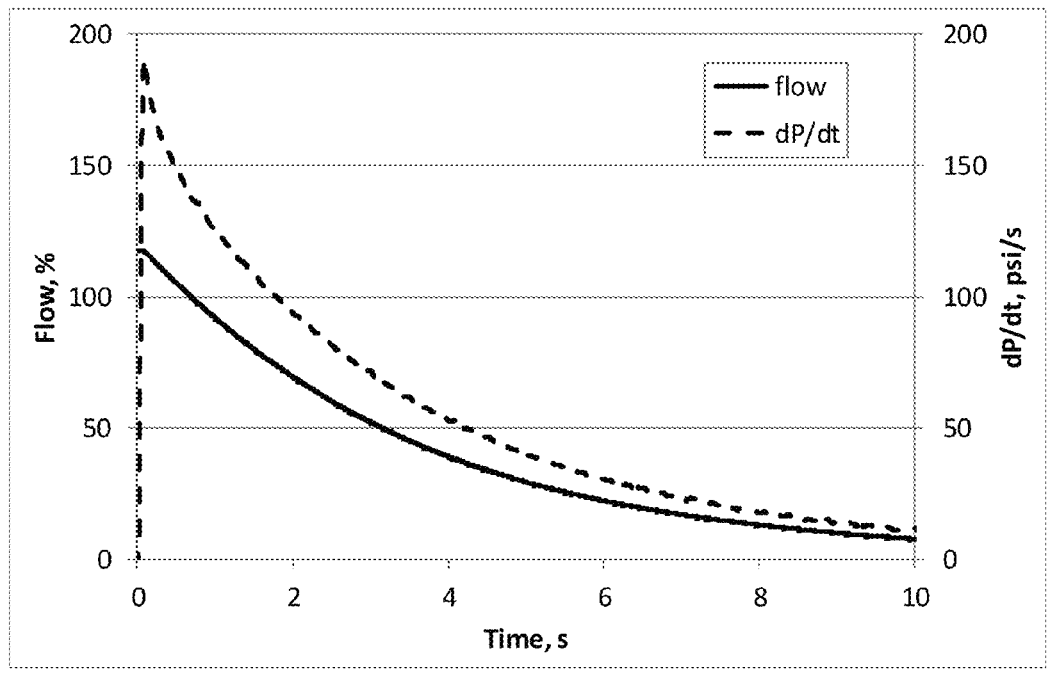
FIG. 4B is a graph depicting the flow rate and a rate of change of the pressure depicted in FIG. 4A.

As shown, in parallel with the measurement of the decreasing pressure (Block 308) and the calculation of the reference flow rate (Block 310) the thermal mass flow sensor 123 of the MFC 200 is used to measure a flow rate of the fluid through the MFC 200 to obtain a measured flow rate (Block 312). FIG. 4B depicts measured flow ("flow") and a reference flow rate that is calculated by taking a derivative of pressure as a function of time. The measured flow rate is then compared to the reference flow rate (calculated using the pressure measurements) to determine whether the flow through the sensor tube 120 is linearly-proportional to the flow around the bypass 110 (Block 314). For example, based upon the ideal gas law, a rate of change of the pressure dp/dt is generally proportional to (dn/dt)(R)(T) where n is a number of molecules of the gas measured in moles that exist between the upstream valve 103 and the thermal mass flow sensor 123, T is the absolute temperature of the gas and R is the ideal, or universal, gas constant; thus (dp/dt) is proportional to the flow rate of the fluid through the MFC 200. As a consequence, the ratio of dp/dt to the flow rate measured by the sensor 123 is constant if the flow through the sensor tube 120 is linearly-proportional to the flow around the bypass 110. In other words, if the ratio of dp/dt to the flow rate measured by the sensor 123 is constant, it may be assumed that the proper mass flow rate is being diverted through the sensor tube.

The steps described above with reference to Blocks 302-310 may be carried out when the MFC 200 is known to be operating properly (e.g., any contamination within the MFC 200 is within acceptable levels) to obtain a baseline-ratio curve as a reference. The data for the baseline-ratio curve may be stored in a memory of the MFC 200 and may be utilized to determine whether there may be contamination in the bypass portion 120 of the MFC 200. For example, a manufacture and/or operator of the MFC 200 may carry out the steps associated with Blocks 302-310 just before initiating a process run (e.g., thin-film deposition) with the MFC 200.

Figure 4C:
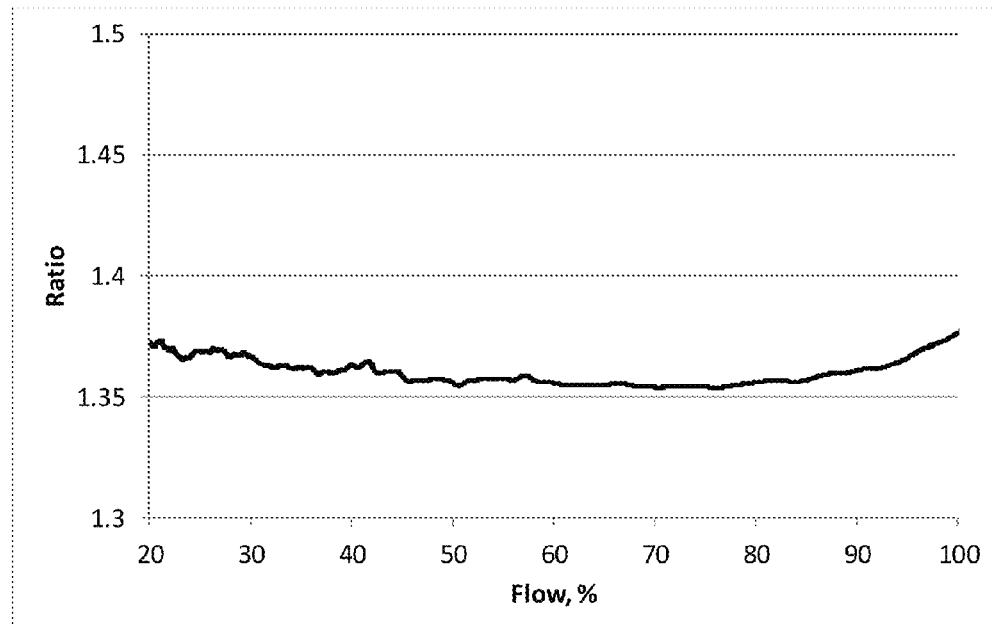
FIG. 4C is a graph depicting an exemplary baseline ratio curve that relates the rate of change of the pressure depicted in FIG. 4B to the flow rate depicted in FIGS. 4A and 4B.

Referring to FIG. 4C, for example, it is a graph depicting an exemplary baseline-ratio of dp/dt to the measured flow that may be used as a reference. Although there is some variation in the ratio of dp/dt to the measured flow (as measured by the thermal mass flow sensor 123), the collection of data in FIG. 4C that makes up the baseline-ratio curve may be used as a baseline by which the comparison of Block 314 may be carried out.

It should be noted that the flow rate through the MFC 200 is proportional to dp/dt and the volume between the upstream valve 103 and the thermal mass flow sensor 123, and the flow rate is inversely proportional to temperature. Nonetheless, neither the volume (between the upstream valve 103 and the mass flow sensor 123) nor the temperature needs to be known. More specifically, information about the volume is unnecessary because only the "non-linearity" of the flow through the sensor tube 120 relative to the flow around the bypass 110 is estimated, and the comparison at Block 314 reveals whether the non-linearity is changing over time or not. Any indication of non-linearity may be obtained by monitoring the ratio of dp/dt to the measured flow rate. Ideally the ratio is a constant value, but the real ratio may be different. A "measure" of contamination may be how much a shape of a new, test-ratio curve is different from the shape of the baseline-ratio (depicted in FIG. 4C) that is obtained during manufacturing or during initial operation of the MFC on the tool. Temperature does not need to be measured because the flow measurement may be performed very quickly (e.g., over only a few seconds) so that the temperature does not change during each measurement interval.

Comparison of the shape of a test-ratio curve obtained during operation to the baseline-ratio may be performed by comparing characterization values that each characterizes one of the baseline-ratio curve and a test-ratio curve. One approach to calculating a characterization value (curve_value) is as follows: curve_value=(max_value−min_value)/(average_value) where max_value is a maximum value of a curve, min_value is a minimum value of the curve, and the average_value is an average value of the curve. When each of the baseline-ratio curve and the test-ratio curve are characterized as a single value, the corresponding value may simply be compared to determine whether a change has occurred in the MFC 200 that is indicative of contamination. If this simple comparison (of characterization values) suggests there may be contamination within the MFC 200, then a detailed analysis of the curve data may be performed to help determine the particular location of the contamination. An alternate approach to calculating a characterization value may be performed as follows: curve_value=((ratio_100%+ratio_20%)/(ratio_60%)) where ratio_100% is a value of the ratio curve at 100% flow; ratio_20% is a value of the ratio curve at 20% flow; and ratio_60% is a value of the curve at 60% of flow.

Figure 4D:
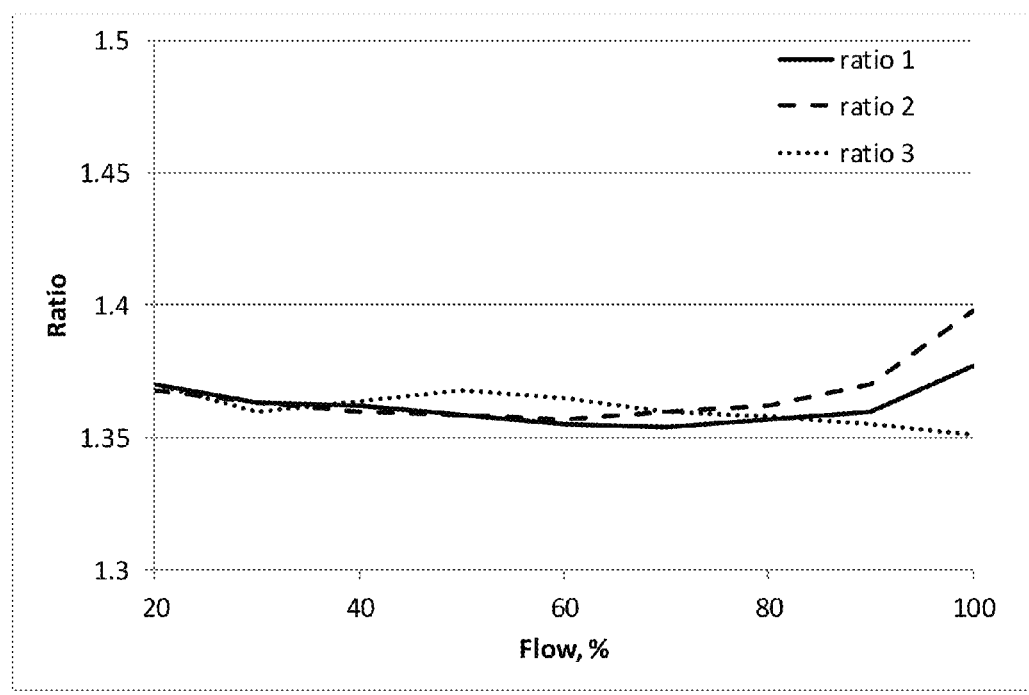
FIG. 4D is a graph depicting the baseline ratio curve illustrated in FIG. 4C along with exemplary test ratio curves.

Referring to FIG. 4D, it depicts three ratio curves: a baseline-ratio curve (ratio 1); a first-test-ratio curve (ratio 2); and a second-test-ratio curve (ratio 3). As shown, values of first-test-ratio curve are greater than values of the baseline-ratio curve at flow rates above 90%, which is indicative of contamination within the bypass portion 100 of the MFC 200. In contrast, values of second-test-ratio curve are lower than values of the baseline-ratio curve at flow rates above 90%, which is indicative of contamination within the thermal mass flow sensor 123 of the MFC 200.

Figure 5:
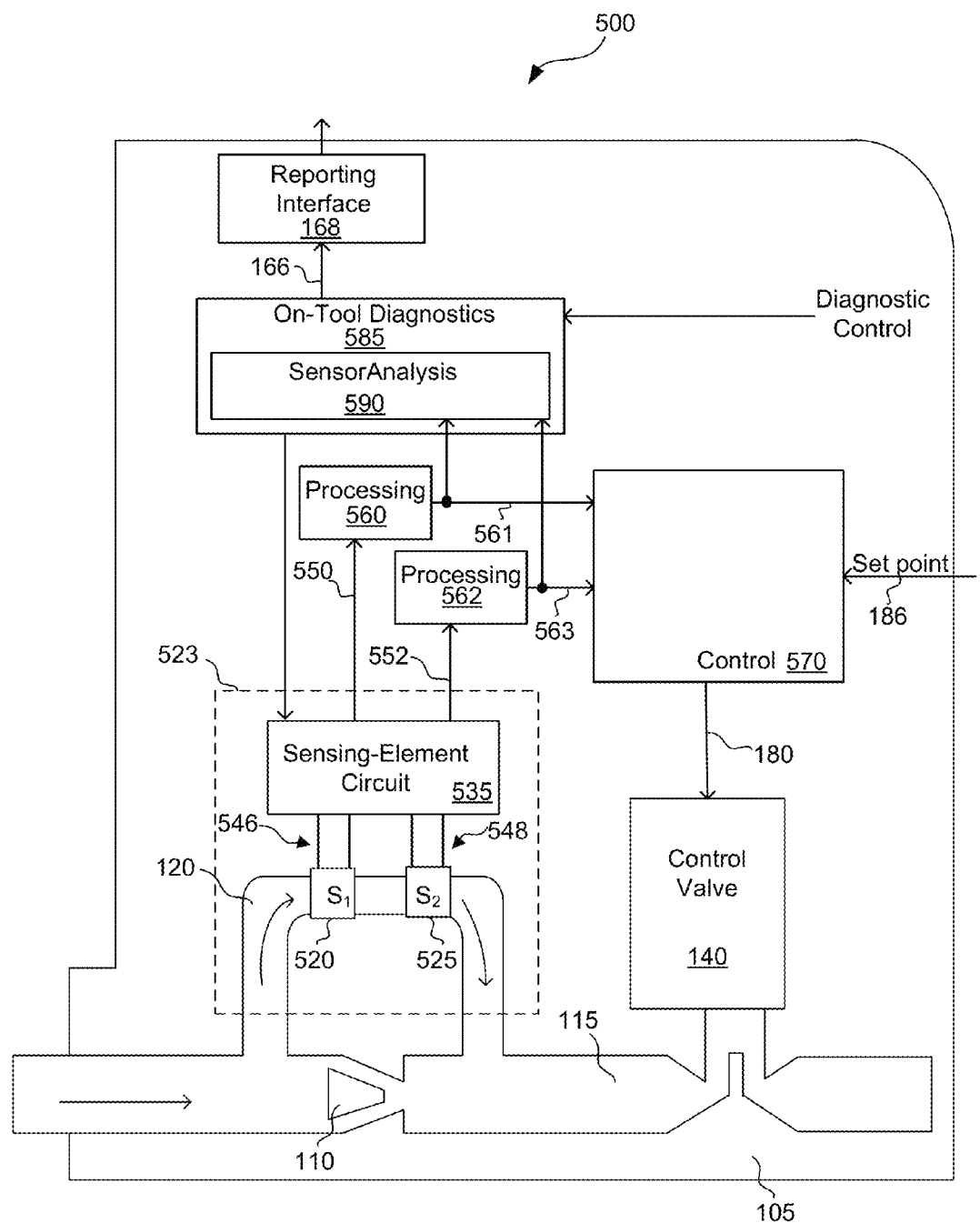
FIG. 5 is a diagram depicting another embodiment of the mass flow controller illustrated in FIG. 1.

Referring next to FIG. 5, it depicts an exemplary mass flow controller (MFC) 500 that includes a sensor analysis component 590 in an on-tool diagnostic portion 585. As depicted, in the present embodiment heating-sensing elements 520 and 525 are coupled to the outside of sensor tube 120. In one illustrative embodiment, heating-sensing elements 520 and 525 are coils of conductive wire that are wound around the sensor tube 120.

As depicted, heating-sensing elements 520 and 525 are included within a thermal mass flow sensor 523 and are electrically connected to a sensing-element circuit 535. In this particular embodiment, the sensing-element circuit 535 is configured (responsive to signals 546, 548 from the heating-sensing elements 520 and 525) to provide two flow sensor signals 550 and 552 (also referred to herein as outputs 520 and 525). Each of these flow sensor signals 550 and 552 separately (and/or together) is indicative of the flow rate through the sensor tube 120, and hence, indicative of the flow rate through the main path 115 of the MFC 500. The sensor analysis component 590 employs on-tool methodologies to diagnose whether there are potential problems with the sensor tube 120 (e.g., contamination) and whether there may be any deficiency with the sensitivity of the thermal mass flow sensor 523. Some of the diagnostic methodologies disclosed herein utilize both of the two flow sensor signals 550 and 552, but others operate without requiring use of both of the flow sensor signals 550 and 552.

As shown in FIG. 5, the flow sensor signals 550 and 552 may be processed by processing portions 560, 562 to generate measured flow signals 561, 563 corresponding to the first and second flow sensor signals 550, 552. For example, the measured flow signals 561, 563 may be respective digital representations of the flow sensor signals 550, 552. More specifically, the processing portions 560, 562 may amplify and convert, using an analog to digital converter, the flow sensor signals 550, 552 to digital representations of the flow sensor signals 550, 552.

As one of ordinary skill in the art will readily recognize, the processing portions 560, 562 may also adjust each of the flow sensor signals 550, 552 (e.g., by adjusting each of the signals by predetermined calibration coefficients) based upon physical characteristics of the MFC 500 and/or characteristics of the fluid (e.g., gas) flowing through the MFC 500.

The control component 570 in this embodiment is generally configured to control a position of the control valve 140 based upon one, or both, of the measured flow signals 561 and 563. In some embodiments the control component 570 may utilize both measured flow signals 561 and 563 simultaneously to control flow of the mass flow controller 500.

Figure 6:
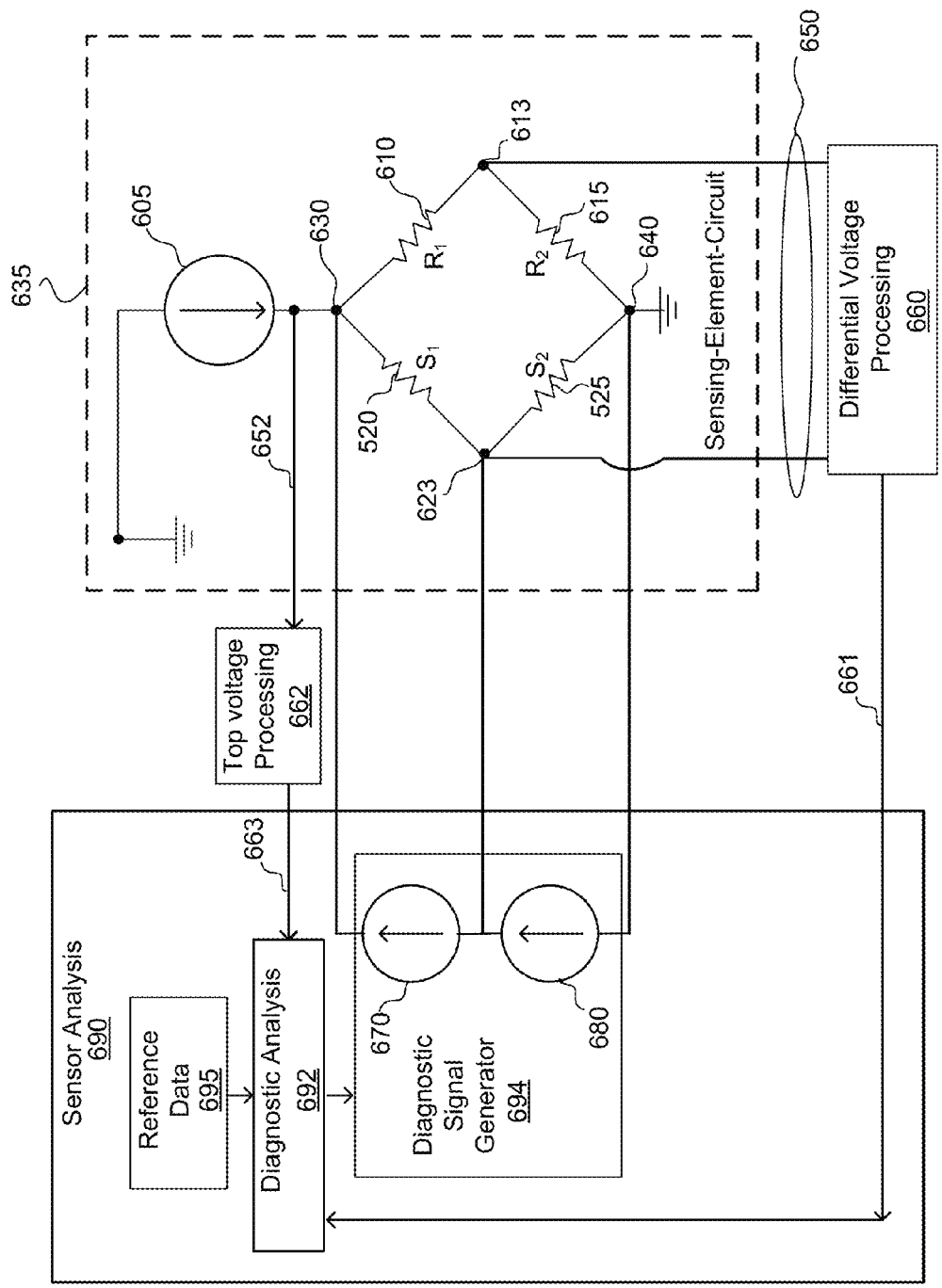
FIG. 6 is a diagram depicting an exemplary portion of the mass flow controller described with reference to FIG. 5.

The sensing-element circuit 535 may be realized by a variety of circuit architectures, but FIG. 6 for example, depicts an exemplary sensing-element circuit 635 within a portion of an MFC (e.g., MFC 500). As shown, in this embodiment a sensor-current-source 605 supplies a substantially constant electrical current to a bridge circuit, which includes four nodes (630, 613, 640, and 623) between which elements are connected.

Among those elements are two fixed resistive elements 610 and 615 ($R_1$ and $R_2$, respectively). In one illustrative embodiment, fixed resistive elements 610 and 615 are both 10 k Ohm precision resistors. In addition, heating-sensing elements 520 and 525 (shown as resistances $S_1$ and $S_2$, respectively) form a leg of the bridge circuit, and as shown, heating-sensing elements 520 and 525 have one node, node 623, in common.

The sensor-current-source 605 in this embodiment supplies heating-sensing elements 520 and 525 with a substantially constant electrical current, resulting in the heating of sensor tube 120. The gas flow through the sensor tube 120 produces a temperature differential, which produces a first flow sensor signal 650 that is a differential voltage between the second node 613 and the fourth node 623. A second flow sensor signal 652 is a voltage (also referred to as a "top" voltage) between a first node 630 and a third node 640, which changes because the average temperature of the heating-sensing elements 520 and 525 is decreasing due to gas flow.

The flow sensor signal 650 varies with the temperature differential between heating-sensing elements 520 and 525 in an approximately proportional manner, and flow sensor signal 652 varies, in a nonlinear manner, based upon average temperature. As depicted, the flow sensor signals 650, 652 may be fed to corresponding processing components 660 and 662 to be processed (e.g., fed to a differential amplifier, digitized, calibrated, and normalized) so that control logic (e.g., the control component 570) may utilize the first and second flow sensor signals 650, 652 to control the control valve 140. Although not depicted for clarity, calibration data may be stored in a memory in the form of a look up table that maps data that is based upon processed representations of the two flow sensor signals 650, 652 to flow values for a calibration gas, and during operation, the look up table is accessed to determine actual flow values when a process gas is being controlled.

To arrive at a more accurate measure of the mass flow, the heat capacity (Cp) at constant pressure of the gas is utilized. In many embodiments, the sensing-element circuit 635 is calibrated with one gas (e.g., Nitrogen) and the ratio of the heat capacities of the calibration gas to the operating gas (e.g., Cp(N2)/Cp(gas)), which is referred to a conversion factor (CF), may be derived. The conversion factor (CF) may be derived analytically (e.g., as a ratio of well-known heat capacities) or it may be obtained from live gas testing.

In general, the sensor analysis component 690 utilizes thermal sensor diagnostic techniques to detect contamination inside the sensor tube 120. For example, contamination in the center of the tube 120 and/or close to the heating sensing elements 520 and 525 may be detected, and in addition, changes in the sensor insulation and the sensor housing may also be detected. Tests associated with the embodiments depicted in FIGS. 5 and 6 may be performed with a gas inside the tube 120, or without the gas in the tube (e.g., a vacuum in the tube 120).

As shown, the sensor analysis component 690 includes stored reference data 695 that may include response data obtained (e.g., by a manufacturer) before the MFC 500 is provided to the end-user. In general, the reference data 695 characterizes responses of the thermal mass flow sensor 523 to changes in current through one or more of the heating-sensing elements 520 and 525 when the thermal mass flow sensor 523 is operating properly (e.g., to provide flow sensor signals within acceptable tolerances). For example the reference data may characterize a transient response of the first flow sensor signal (also referred to as differential voltage) 650 and/or second flow sensor signal (also referred to as top voltage) 652 under nominal conditions to changes in the current provided to the heating-sensing elements 520 and 525. For example, the response data may include data that characterizes rise time, delay, undershoot, overshoot, etc.

The response data may also include data that defines transient response curves (under normal conditions), which may be compared to on-tool response curves.

Figure 7:
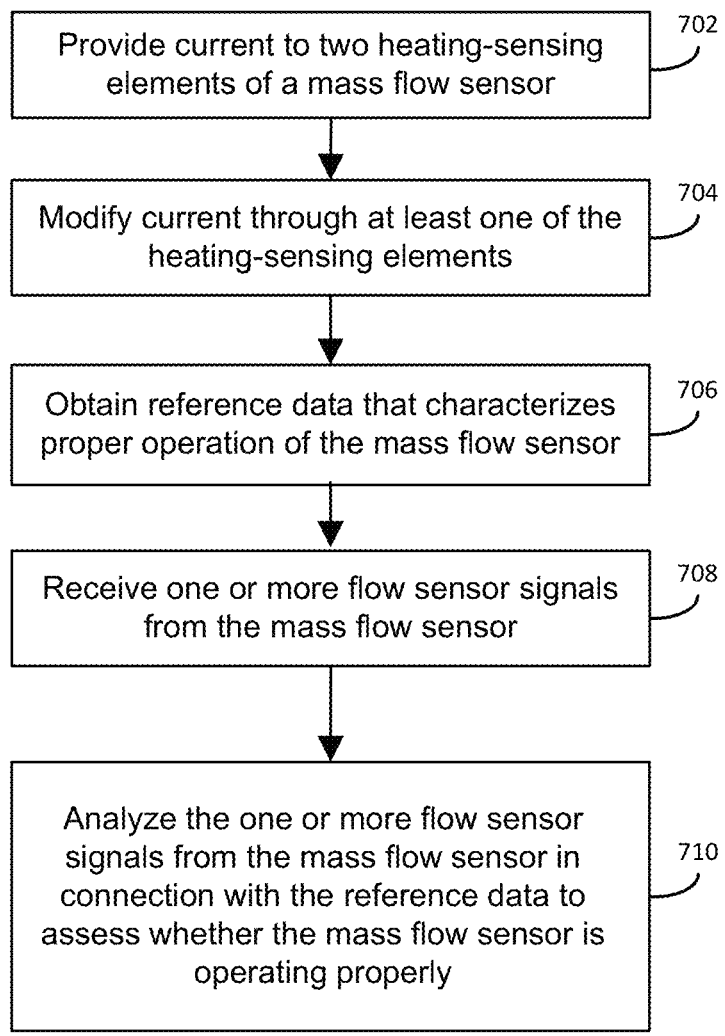
FIG. 7 is a flowchart depicting an exemplary method that may be traversed by the mass flow controller illustrated in FIG. 6.

While referring to FIGS. 5 and 6, simultaneous reference is made to FIG. 7, which is a flowchart depicting a method for determining whether a thermal sensor (e.g., the thermal sensor 523) is operating properly. As shown, current is provided to the two heating-sensing elements 520 and 525 (Block 702)(e.g., by the sensor-current-source 605), and the current through at least one of the heating-sensing elements is modified (Block 704). As depicted in FIG. 6, a diagnostic analysis component 692 may control a diagnostic signal generator 694 that includes two test-current sources 670 and 680, which are each capable of providing current to a corresponding one of the heating-sensing elements 520 and 525 (e.g., while the MFC 500 is coupled to the tool, but between process runs).

During one exemplary test, the current through one or both of the heating-sensing elements 520 and 525 is modified, and a transient response from the thermal mass flow sensor 523 is monitored. As one of ordinary skill in the art in view of this disclosure will appreciate, the current that is provided to the heating-sensing elements 520 and 525 emulates the effects that a change in gas flow has upon the heating-sensing elements 520 and 525. More specifically, the modification to the current through one or both of the heating-sensing elements 520 and 525 will cause a transient signal from both of the flow sensor signals 650 and 652. Although the response of the thermal mass flow sensor 523 to modified currents from the diagnostic signal generator 694 emulates actual operation (when gas flow is controlled during plasma processing), the response data (e.g., in the form of a test curve) is not affected by gas flow dynamics and, importantly, the response data is not affected by pressure perturbations in the gas supply line, which is a major reason for flow deviations in low-flow MFCs.

As shown in FIG. 7, reference data 696 is obtained from the stored reference data 695 that characterizes proper operation of the thermal mass flow sensor (Block 706). As discussed above, the stored reference data includes response data obtained (e.g., by a manufacturer) before the MFC 500 is provided to the end-user, that characterizes a transient response of the differential voltage 650 and/or top voltage 652 (under nominal conditions) to changes in the current provided to the heating-sensing elements 520 and 525. For example, the response data may include data that characterizes rise time, delay, undershoot, overshoot, etc. The response data may also include data that defines transient response curves (under normal conditions), which may be compared to on-tool response curves.

As depicted, one or more flow sensor signals are received from the thermal mass flow sensor 523 (Block 708). Although it is contemplated that the flow sensor signals 550, 552, 650, 652 may be utilized in connection with Block 708 and the method depicted in FIG. 7, in the embodiment depicted in FIG. 6, digital representations of the flow sensor signals 550, 552, 650, 652 (referred to herein as measured flow signals 561, 563, 661, 663) may be utilized. For example, the diagnostic analysis component 692 may measure the response of the thermal mass flow sensor 523 utilizing one or more of the measured flow signals 661 and 663 output from the differential voltage processing component 660 and/or the top voltage processing component 662, respectively.

The diagnostic analysis component 692 then analyzes the one or more flow sensor signals from the thermal mass flow sensor 523 in connection with the reference data 695 to assess whether the thermal mass flow sensor 523 is operating properly (Block 710). For example, the diagnostic analysis component 692 compares the response of the output of the differential voltage processing component 660 and/or the top voltage processing component 662 to the stored reference data 695 to determine whether the thermal mass flow sensor 523 is operating properly.

Figure 8:
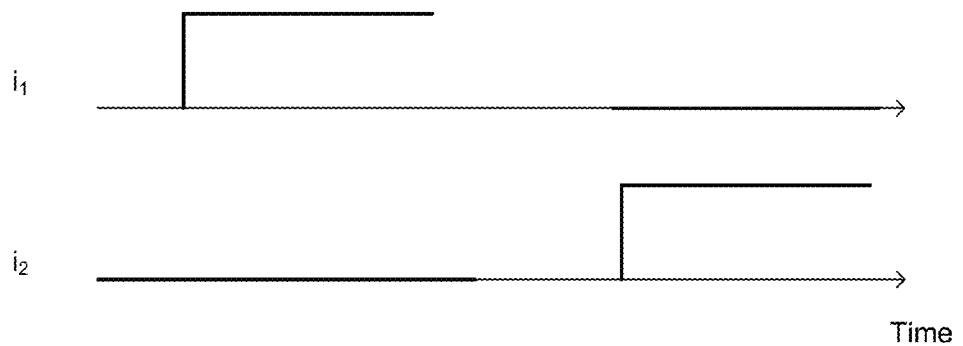
FIG. 8 is a graph depicting exemplary currents that may be provided to the heating-sensing elements depicted in FIGS. 5 and 6.

As shown in FIG. 8, in one exemplary test mode, an increase in current ($i_1$) may be provided to one heating-sensing element (e.g., heating-sensing element 520) and a similar increase in current ($i_2$) may be provided to the other heating-sensing element (e.g., heating-sensing element 525) so current is modified in only one heating-sensing element at a time. Each transient curve obtained during each increase in current can be compared with the "reference" curve measured during manufacturing and stored in the reference data 695.

In addition, another diagnostic method may be employed in connection with the depicted application of current in FIG. 8. This method enables detection of abnormalities of the heat transfer in the thermal sensor due to non-symmetry of the sensor characteristics caused by contamination or insulation. It can be detected by applying step-like-current-increases to the first heating-sensing element 520, obtaining a transient curve, then applying similar step-like-current-increases to the second heating-sensing element 525, obtaining a transient curve, and then comparing these two transient curves. Any non-symmetry of the characteristics of the heating-sensing elements 520 and 525 will cause a difference in the response curves, which indicates that one or both of the heating-sensing elements may not be operating as expected (e.g., one or both of the heating-sensing elements may be deficient in one or more aspects). This test is typically not possible to perform with actual gas because the MFC and the tool normally cannot run reverse gas flow. This particular diagnostic approach does not require a comparison with a manufacturing "reference" curve.

Figure 9:
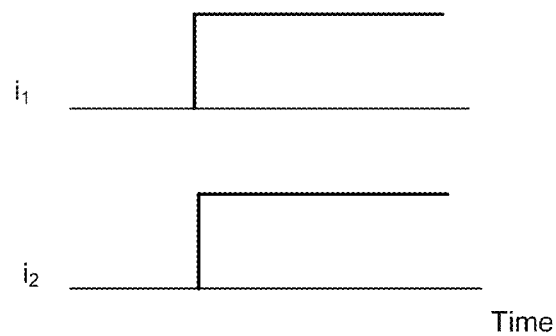
FIG. 9 is graph depicting additional exemplary currents that may be provided to the heating-sensing elements depicted in FIGS. 5 and 6.
Figure 10:
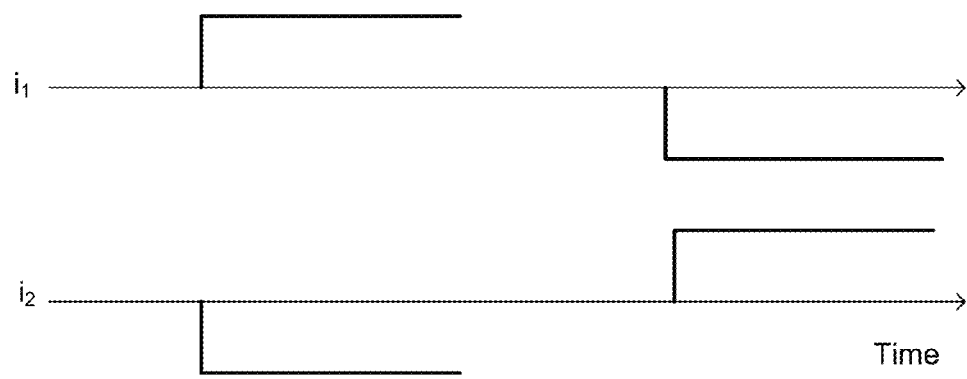
FIG. 10 is a graph depicting yet more exemplary currents that may be provided to the heating-sensing elements depicted in FIGS. 5 and 6.

In another test mode, as depicted in FIG. 9, an increase in current is provided to both heating-sensing elements 520 and 525 simultaneously, and in yet another test mode depicted in FIG. 10, current is provided to both heating-sensing elements 520 and 525 simultaneously, but current is provided in an opposite direction to one heating-sensing element (to decrease current through that heating-sensing element). In each instance, the diagnostic analysis component 692 may compare the signals of one (or both) of the top voltage processing component 662 or the differential voltage processing component 660 to the reference data 695 measured in the manufacturing and stored in the MFC memory.

Figure 11:
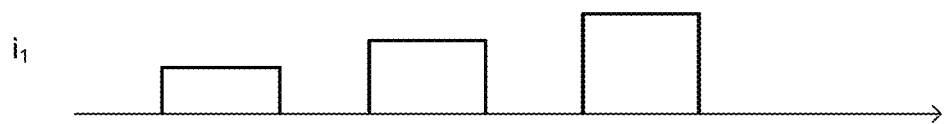
FIG. 11 is a graph depicting step-wise current increases that may be provided to the heating-sensing elements depicted in FIGS. 5 and 6.

Referring to FIG. 11, yet another test mode includes successive step-wise increases to the current provided to one of the heating-sensing elements 520 and 525 to analyze the output of the tested heating-sensing element as compared to reference data 695 obtained under similar applications of current during nominal conditions.

Regardless of what the root cause of the change is (between a test and the reference data), the MFC 500 can indicate to the user that some anomaly is present. In many embodiments, the MFC 500 does not have to indicate what the issue/problem is—it only needs to notify the user that some issue exists.

Figure 12:
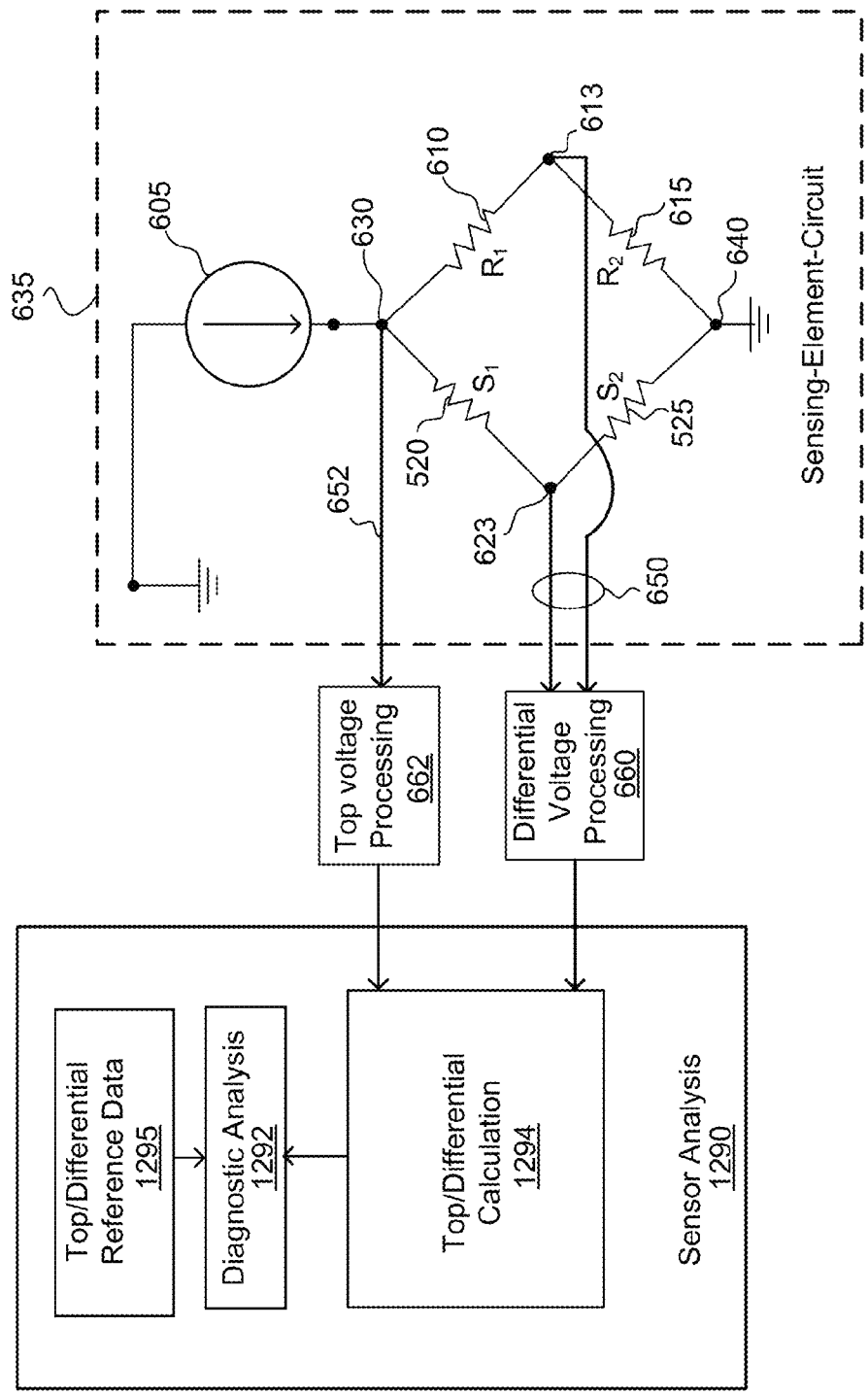
FIG. 12 is a diagram depicting a portion of yet another embodiment of the mass flow controller described with reference to FIG. 1.

Referring next to FIG. 12, shown is another portion of a mass flow controller with a sensor analysis component 1290 that includes a diagnostic analysis component 1292 that is coupled to top/differential voltage reference data 1295 and a top/differential calculation component 1294. In this embodiment, the diagnostic analysis component 1292 verifies accuracy of the MFC on tool, without external flow verifiers and standards. In many implementations, the diagnostic analysis component 1292 does not provide absolute flow verification (i.e., an exact absolute value of the fluid flow), but it does detect if flow measurements are different from those that were obtained during a calibration of the MFC (e.g., by manufacturer before the user receives the MFC) at the same flow, which means that the accuracy of the MFC is questionable.

In this embodiment, sensor sensitivity can be verified by using the first flow sensor signal 650 (also referred to as differential voltage) and the second flow sensor signal 652 (also referred to as top voltage). During calibration (e.g., by the manufacturer of the MFC) both the differential voltage 650 and top voltage 652 are measured and stored in memory as the top/differential reference voltage data 1295. Additional details of the relationship between the top voltage 652 and differential voltage 650 are found in U.S. patent application Ser. No. 12/575,574, filed Apr. 9, 2010, entitled "MASS FLOW CONTROLLER WITH ENHANCED OPERATING RANGE," which is incorporated herein by reference.

Figure 13:
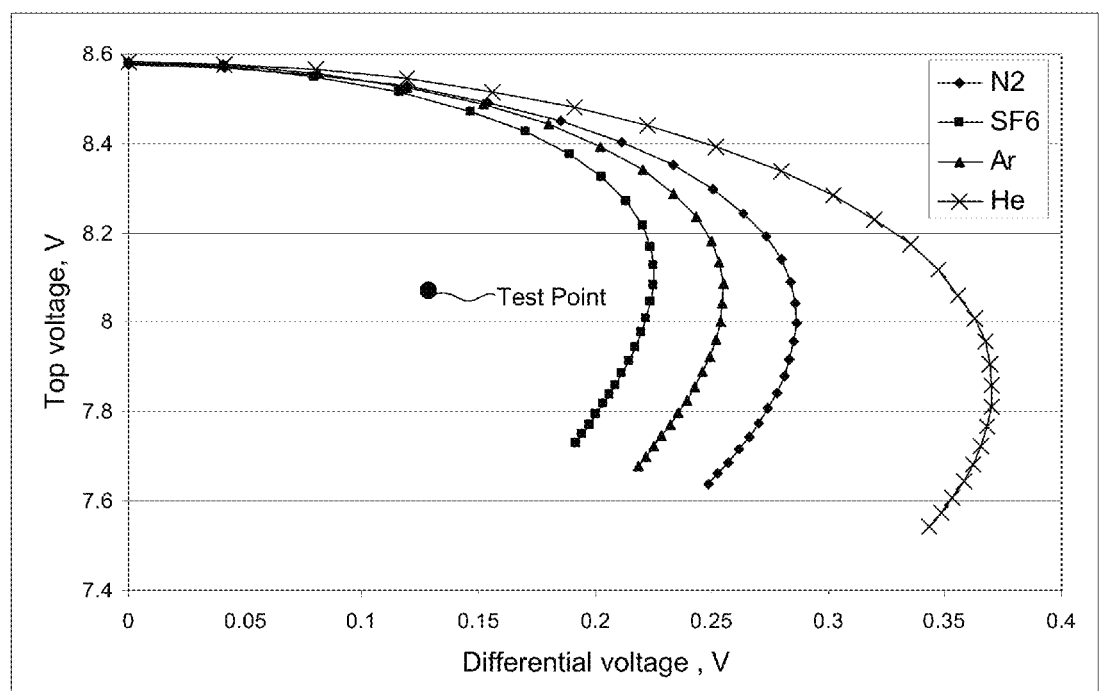
FIG. 13 is a graph depicting exemplary top/differential voltage reference data that may be utilized by the mass flow controller described with reference to FIG. 12.

Referring to FIG. 13, for example, shown is exemplary top/differential voltage reference data 1295 for several types of gases. The top versus differential voltage characteristics depend on sensor geometry, insulation, and thermal conductivity of the gas. For a given gas, the top versus differential voltage combination at any flow during a test should be located at the same curve as that obtained during calibration. During a verification or test cycle (or even during normal MFC operation), the top versus differential voltages are compared with the reference data 1295. If the voltage pair is more than a tolerated deviation off of the curve (as shown by the test point depicted in FIG. 13), the sensor readings are not correct, which could be due to a physical change in the insulator or a contamination of the sensor close to the sensor coils.

Although the top/differential reference voltage data 1295 may include data for different gases, Applicants have discovered that a well-defined relationship exists between a first measurement channel that includes the differential voltage 650 between the second 613 and fourth 623 nodes of the bridge circuit and a second measurement channel that includes the top voltage 652 of the first node 630 (also referred to herein as a top potential) of the bridge circuit. This relationship obviates the need for storing top/differential voltage reference data for several different types of gases. Specifically, Applicants have found that, for any two arbitrary gases (gas 1 and gas 2), the differential voltage 650 and the voltage at the first node 630 of the bridge satisfies the following equations across a wide flow range:

$$D1(f) = D2(SF * f)/SF \qquad \text{eqn (1)}$$

$$T1(f) - T1(0) = (T2(SF*f) - T2(0))/SF \qquad \text{eqn (2)}$$

where f is flow; D1 and D2 are differential voltage functions for gas 1 and gas 2, respectively (e.g., D1 is the voltage differential between nodes 613 and 623 for gas 1 and D2 is the differential voltage 650 between nodes 613 and 623 for gas 2); T1 and T2 are the top voltage functions (potential at the first node 630) for gas 1 and gas 2, respectively; T(0) is the top voltage 652 at the first node 630 at zero flow; and SF is a saturation factor, which is a function of the thermal conductivity of gas 1 and gas 2.

Figure 14:
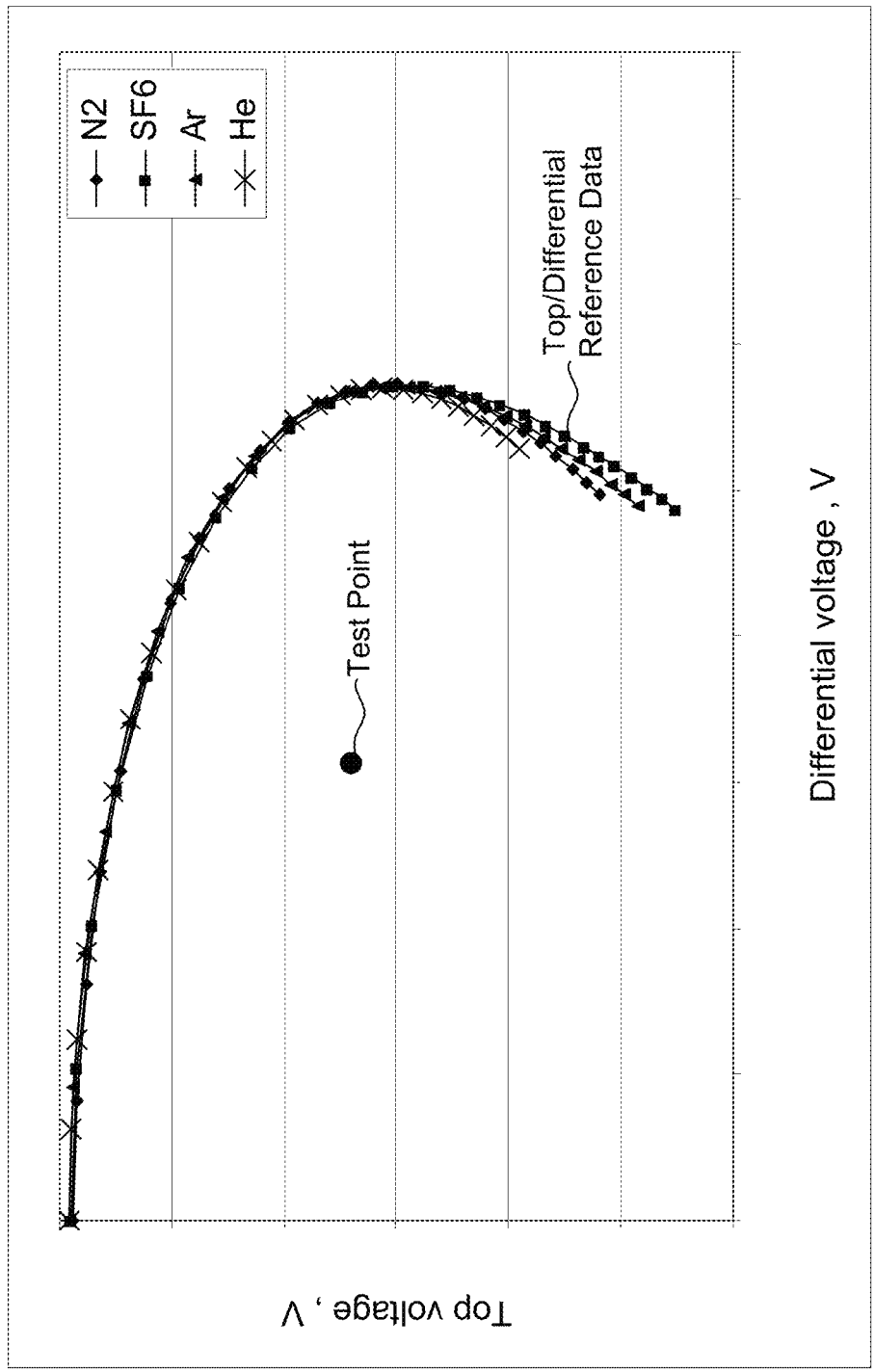
FIG. 14 is a graph depicting a scaled versions of the top/differential voltage reference data in FIG. 13.

Graphically, these equations can be represented by scaling both flow and voltage axes of the graph by a saturation factor SF that is a gas specific factor (i.e., SF is different for each gas). FIG. 14, for example, depicts in accordance with eqn. 1 and eqn. 2, a scaled versions of the graph in FIG. 13, respectively. As shown, when scaled by SF, the data for various process gases can be scaled to match the calibration (e.g., nitrogen) data.

Figure 15:
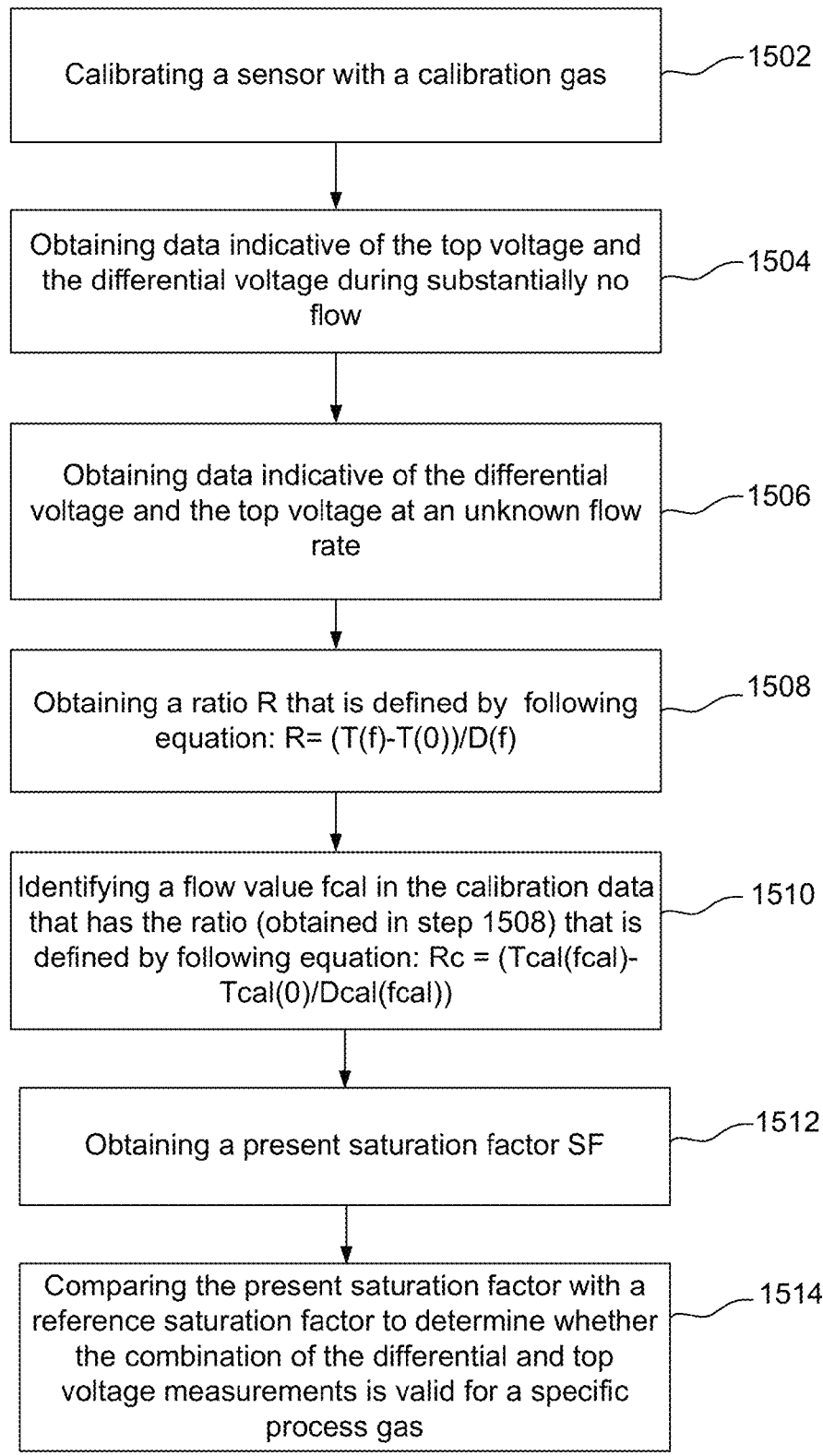
FIG. 15 is a flowchart illustrating a method that may be carried out by the mass flow controller described with reference to FIG. 12.

Referring to FIG. 15, it is a flowchart depicting a method for determining whether the combination of both the differential voltage 650 and top voltage 652 is providing valid data for a specific process gas. As shown, the sensing-element 635 is calibrated (e.g., before the sensor is provided to an end user) with calibration gas (e.g., nitrogen) to obtain the top/differential voltage reference data (Block 1502). In many modes of operation, the top/differential voltage reference data (also referred to herein as calibration data) includes data based upon a differential voltage Dcal(fcal) (e.g., voltage 650) and the top voltage Tcal(fcal) at the first node of the bridge (e.g., node 630) as a function of flow fcal. For example, the top/differential voltage reference data 1295 in many implementations includes, for each flow value, data indicative of both, the differential voltage 650 and the top voltage 630. The data can be stored in a memory in the form of a look-up table.

Referring briefly to FIG. 17A for example, the top/differential voltage reference data 1295 may be organized into N data sets, and each data set may include a flow value, a value indicative of the differential voltage 650 at that flow value, and a value indicative of the top voltage 652 at that flow value. It is certainly contemplated that the calibration data may take on different forms while being dependent upon two signals from a bridge circuit; thus it should be recognized that the specific data format in FIG. 17A (and FIG. 17B) may vary without departing from the scope of the present invention.

As depicted, the calibration data may be placed in memory in the form of a look-up table that maps flow values of a calibration gas with calibration data that is based upon values of two flow sensor signals 650 and 652 from a thermal mass flow sensor 523. In addition, each of the N data sets may include a calibration ratio that is based upon the ratio of the top voltage to the differential voltage. As depicted in FIG. 17A, the calibration ratio may be corrected for the zero offset voltage of the top voltage so that, for a particular flow value fcal, the calibration ratio is defined as (Tcal(fcal)−Tcal(0))/Dcal(fcal). Although not depicted in FIG. 17A for simplicity, it is also contemplated that values based upon the differential voltage may be corrected for the zero offset voltage of the differential voltage 650.

Although not required, as depicted in FIG. 17A, an amplitude value may also be calculated (and stored in advance of operation) that is defined as sqrt[(Tcal(fcal)−Tcal(0))$^2$+Dcal(fcal)$^2$]. In alternative embodiments, the Amplitude value may be calculated once the mass flow controller is in operation, and in these alternative embodiments, the calibration data need not include the Amplitude value.

As depicted in FIG. 15, once the sensor (e.g., sensor 123) is calibrated and in use, at no flow, the top voltage 652 T(0) at the first node 630 and the differential voltage 650 D(0) 650 are measured (e.g., by operator request or automatically in a periodical manner) to obtain zero-offset data (Block 1504). D(0) and T(0) depend upon temperature and both may drift significantly as temperature changes. With respect to D(0), it is preferably equal to zero, but due to temperature it may not be zero, so the actual value may be measured and subtracted from all D values presented below (but for simplicity this subtraction is not shown below). T(0) also drifts with temperature, and as a consequence, it is subtracted from the top voltage T as indicated below. In operation, for an unknown gas flow "f," the differential voltage D(f) 650 and the top voltage 652 at the first node T(f) are measured (Block 1506), and an operational ratio R is calculated based upon the ratio of the top voltage to the differential voltage so that the operational ratio is defined as: $R=(T(f)-T(0))/D(f)$ (Block 1508). Referring briefly to FIG. 17B, for example, memory may store the measured differential voltage D(f) and the top voltage T(f) and a control portion (e.g., including control component 170) may be utilized to obtain an operational ratio R.

As depicted, once the operational ratio R is obtained, the flow fcal in the calibration data that has the same calibration ratio defined by: $R_{cal}=(Tcal(fcal)-Tcal(0))/Dcal(fcal)$ is obtained (e.g., by searching and retrieving calibration data from a look-up table in memory)(Block 1510). In other words, the calibration data is accessed and the flow value fcal is identified that has a corresponding calibration ratio $R_{cal}$ that equals the operational ratio R ($R_{cal}$=R), and then a present saturation factor SF is calculated: $SF=\text{Amplitude}/\text{sqrt}[(T(f)-T(0))^2+D(f)^2)]$ (Block 1512). As shown, the present saturation factor is then compared with a reference saturation factor (RSF) to determine whether the combination of measurements of the differential voltage 650 and top voltage 652 is valid for a specific process gas (Block 1514). Thus, the diagnostics analysis component assess whether the thermal mass flow sensor 523 is providing valid flow-measurements based upon previously generated reference data. The reference saturation factor may be calculated in connection with the calibration process (e.g., calculated by a manufacturer and stored in non-volatile memory in connection with the calibration data). And any significant change of the present SF relative to the RSF over time is a potential indicator of problems with gas configuration or sensor operation. It is also contemplated that the starting RSF is initially generated during actual processing and stored by the user as a starting value.

Figure 16:
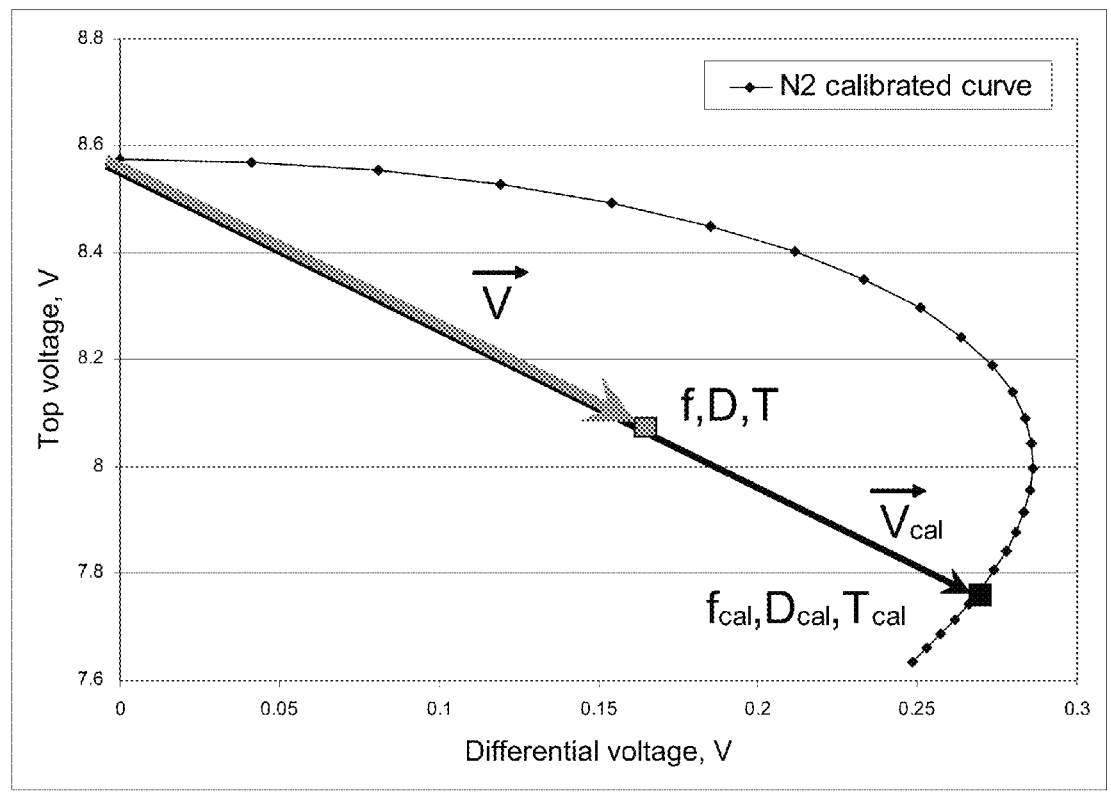
FIG. 16 is a graph that illustrates a graphical representation of the method depicted in FIG. 15.

Referring to FIG. 16, shown is a graphical representation of the method depicted in FIG. 15. As shown, a measured flow "f" with differential voltage 650 (D) and a top voltage 652 (T) at the first node 630 is represented by vector V, with an origin at a zero flow point. The operational ratio $R=(T-T(0))/D$ represents the direction of the vector V. As depicted, a vector Vcal has the same origin and direction, and points to calibration point with a ratio Rc that is the same as the operational ratio R. The ratio of the amplitudes of vector Vcal and vector V is the saturation factor: $SF=\text{abs}(Vcal)/\text{abs}(V)$. Thus, the structure and methodologies disclosed herein enable the differential and top voltage outputs to be validated for an unknown gas with unknown thermal conductivity over a wide flow range.

Figure 18:
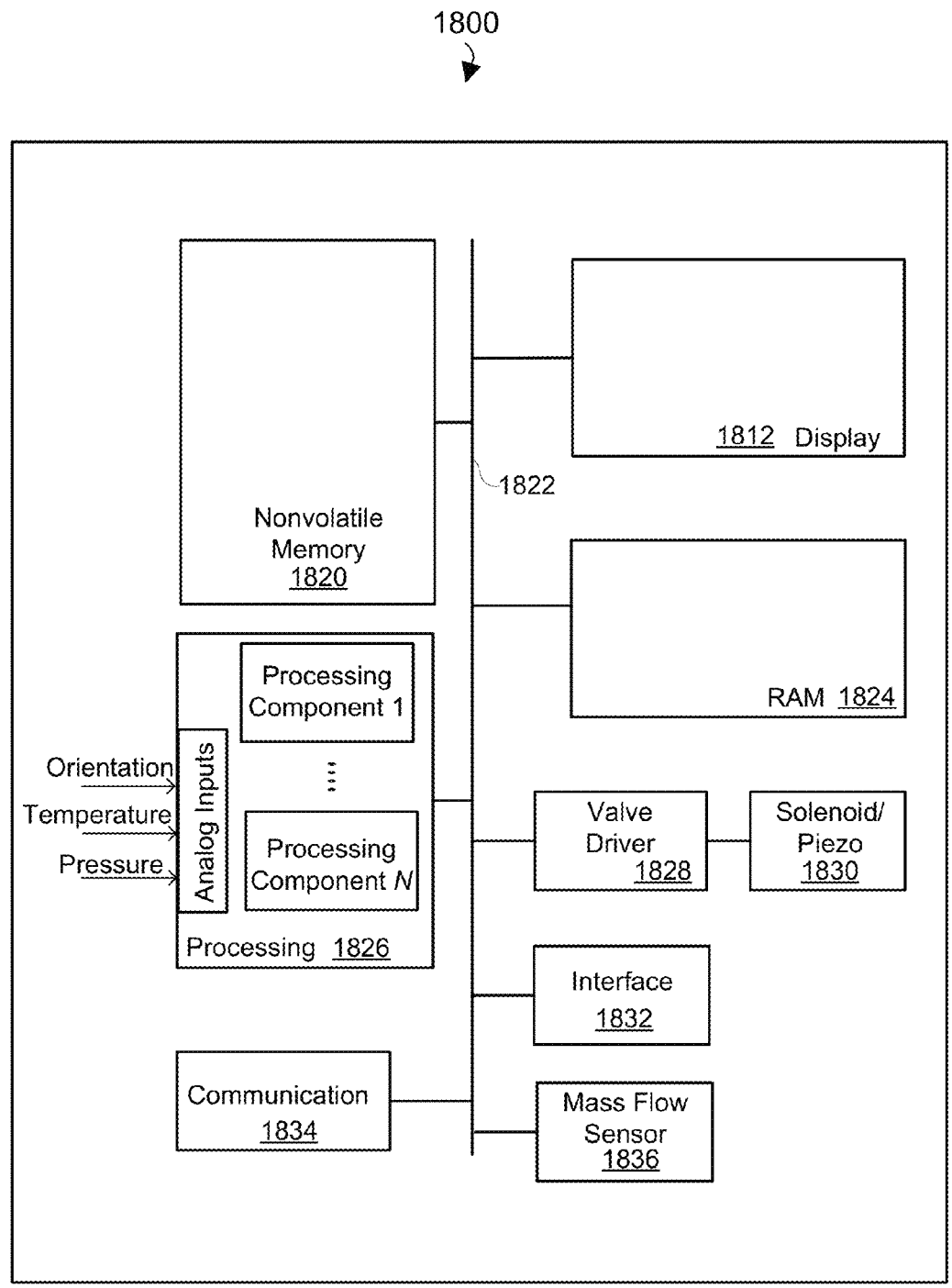
FIG. 18 is a block diagram that depicts physical components that may be utilized to realize the mass flow controllers described herein.

Referring next to FIG. 18, shown is a block diagram 1800 depicting physical components that may be utilized to realize embodiments of the MFCs disclosed herein. As shown, a display portion 1812, and nonvolatile memory 1820 are coupled to a bus 1822 that is also coupled to random access memory ("RAM") 1824, a processing portion (which includes N processing components) 1826, a valve driver component 1828 that is in communication with a solenoid or piezo type valve 1830, an interface component 1832. Although the components depicted in FIG. 18 represent physical components, FIG. 18 is not intended to be a hardware diagram; thus many of the components depicted in FIG. 18 may be realized by common constructs or distributed among additional physical components. Moreover, it is certainly contemplated that other existing and yet-to-be developed physical components and architectures may be utilized to implement the functional components described with reference to FIG. 18.

This display portion 1812 generally operates to provide a presentation of content to a user, and in several implementations, the display is realized by an LCD or OLED display. In general, the nonvolatile memory 1820 functions to store (e.g., persistently store) data and executable code including non-transitory processor-executable code that is associated with the functional components depicted herein (e.g., the diagnostic analysis components). In some embodiments for example, the nonvolatile memory 1820 includes bootloader code, software, operating system code, file system code, and code to facilitate the implementation of one or more portions of the components discussed herein.

In many implementations, the nonvolatile memory 1820 is realized by flash memory (e.g., NAND or ONENAND™ memory), but it is certainly contemplated that other memory types may be utilized as well. Although it may be possible to execute the code from the nonvolatile memory 1820, the non-transitory executable code in the nonvolatile memory 1820 is typically loaded into RAM 1824 and executed by one or more of the N processing components in the processing portion 1826. As shown, the processing component 1826 may receive analog temperature and pressure inputs that are utilized by the functions carried out by diagnostic analysis components.

The N processing components in connection with RAM 1824 generally operate to execute the non-transitory instructions stored in nonvolatile memory 1820 to effectuate the functional components and methodologies described herein. For example, the control component 170 may be realized by one or more of the N processing components in connection with non-transitory processor-readable control instrcutions that are executed from RAM 1824. In addition, the on-tool diagnostic component 585 may be realized by one or more of the N processing components in connection with non-transitory processor-readable instructions that are executed from RAM 1824 to carry out the methods described herein. And the memory described herein (e.g., for storing reference data 695) may be realized by the nonvolatile memory 1820.

The interface component 1832 generally represents one or more components that enable a user to interact with the MFC 100. The interface component 1832, for example, may include a keypad, touch screen, and one or more analog or digital controls, and the interface component 1832 may be used to translate an input from a user into the set point signal 155. And the communication component 1834 generally enables the MFC to communicate with external networks and devices including the external processing tools. One of ordinary skill in the art will appreciate that the communication component 1834 may include components (e.g., that are integrated or distributed) to enable a variety of wireless (e.g., WiFi) and wired (e.g., Ethernet) communications.

The mass flow sensor 1836 depicted in FIG. 18 depicts a collection of components known to those of ordinary skill in the art to realize the thermal mass flow sensor 123. These components may include sensing elements, amplifiers, analog-to-digital conversion components, and filters.

Those of skill in the art will appreciate that the information and signals discussed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will also appreciate that the various illustrative logical blocks, modules, circuits, and algorithm steps described in connection with the embodiments disclosed herein may be implemented by other alternative components than those depicted in FIG. 18. To clearly illustrate this interchangeability of hardware and software, various illustrative components, blocks, modules, circuits, and steps have been described above generally in terms of their functionality. Whether such functionality is implemented as hardware, firmware or software in connection with hardware depends upon the particular application and design constraints imposed on the overall system. Skilled artisans may implement the described functionality in varying ways for each particular application, but such implementation decisions should not be interpreted as causing a departure from the scope of the present invention.

More specifically, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor (e.g., as shown in FIG. 18), or in a combination of the two. A software module may reside in non-transitory processor readable mediums such as RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for on-tool diagnosis of a mass flow controller comprising:
   providing current to two heating-sensing elements of a mass flow sensor;
   modifying current through at least one of the heating-sensing elements;
   obtaining reference data that characterizes proper operation of the mass flow sensor;
   analyzing one or more flow sensor signals from the mass flow sensor in connection with the reference data to assess whether the mass flow sensor is operating properly; and
   wherein modifying current includes:
   modifying current through a first of the two heating-sensing elements then modifying current through a second of the two heating-sensing elements so current of only one of the heating-sensing elements is modified at a time.

2. The method of claim 1, wherein modifying current includes providing current with a current source.

3. The method of claim 1, wherein the reference data includes response data selected from the group consisting of rise time, delay, undershoot, and overshoot, wherein the response data characterizes responses of the mass flow sensor to changes in current through at least one of the heating-sensing elements when the mass flow sensor is operating properly, and wherein analyzing includes comparing a response of the one or more flow sensor signals from the mass flow sensor to the response data.

4. A method for on-tool diagnosis of a mass flow controller comprising:
   providing current to two heating-sensing elements of a mass flow sensor;
   modifying current through at least one of the heating-sensing elements;
   obtaining reference data that characterizes proper operation of the mass flow sensor;
   analyzing one or more flow sensor signals from the mass flow sensor in connection with
   the reference data to assess whether the mass flow sensor is operating properly;
   applying step-like-current-increases to a first of the heating-sensing elements;
   obtaining a first transient curve from the one or more flow sensor signals from the mass flow sensor;
   applying the step-like current increases to a second of the heating-sensing elements;
   obtaining a second transient curve from the one or more flow sensor signals of the mass flow sensor; and
   comparing the first and second transient curves to determine whether the two heating-sensing elements are similarly responding to the step-like current increases.

5. A method for on-tool diagnosis of a mass flow controller comprising:
   providing current to two heating-sensing elements of a mass flow sensor;
   modifying current through at least one of the heating-sensing elements;
   obtaining reference data that characterizes proper operation of the mass flow sensor;
   analyzing one or more flow sensor signals from the mass flow sensor in connection with the reference data to assess whether the mass flow sensor is operating properly; and
   wherein the reference data includes transient response curves that characterize responses of the mass flow sensor when the mass flow sensor is operating properly, and wherein analyzing includes comparing the transient response curves from the reference data with response curves obtained from the one or more flow sensor signals of the mass flow sensor.

6. A mass flow controller with on-tool diagnostics capability comprising:
- a main flow path for a fluid;
- a control valve to control a flow rate of the fluid;
- a mass flow sensor coupled to the main flow path including two heating-sensing elements for measuring a mass flow rate of the fluid;
- a control component coupled to the mass flow sensor and the control valve to control a position of the control valve based upon a set point; and
- a sensor analysis component including:
  - a diagnostic signal generator that modifies current through one or both of the two heating-sensing elements, wherein the diagnostic signal generator includes two current sources, each of the two current sources modifies current through a corresponding one of the two heating-sensing elements;
  - memory configured to store reference data that characterizes proper operation of the mass flow sensor; and
  - a diagnostic analysis component that analyzes one or more flow sensor signals from the mass flow sensor in connection with the reference data to assess whether the mass flow sensor is operating properly.

7. A mass flow controller with on-tool diagnostics capability comprising:
- a main flow path for a fluid;
- a control valve to control a flow rate of the fluid;
- a mass flow sensor coupled to the main flow path, the mass flow sensor including a sensor-current-source and two heating-sensing elements to provide a measure of a mass flow rate of the fluid through the main flow path;
- a control component coupled to the mass flow sensor and the control valve to control a position of the control valve based upon a set point and the measure of the mass flow rate of the fluid;
- memory configured to store reference data that characterizes proper operation of the mass flow sensor;
- a sensor analysis component including:
  - a diagnostic signal generator that modifies current through one or both of the two heating-sensing elements;
  - a diagnostic analysis component that analyzes one or more flow sensor signals from the mass flow sensor in connection with the reference data to assess whether mass flow sensor is operating properly, the diagnostic analysis component including:
    - a non-transitory, tangible processor readable storage medium, encoded with processor executable instructions to perform a method for on-tool diagnosis of the mass flow controller, the method comprising:
      - providing current from the sensor-current-source to the two heating-sensing elements of a mass flow sensor;
      - modifying current through at least one of the heating-sensing elements to generate modified current, wherein modifying current includes modifying current through a first of the two heating-sensing elements then modifying current through a second of the two heating-sensing elements so current of only one of the heating-sensing elements is modified at a time;
      - obtaining the reference data that characterizes proper operation of the mass flow sensor in response to the modified current; and
      - analyzing a response of the one or more flow sensor signals from the mass flow sensor to the modified current in connection with the reference data to assess whether mass flow sensor is operating properly.

8. The mass flow controller of claim 7, wherein the diagnostic signal generator includes one or more current sources to modify current through one or more corresponding heating-sensing components.

* * * * *